Jan. 18, 1966 E. KARGER 3,230,414

DEFLECTION AMPLITUDE CONTROL USING AUXILIARY TRANSFORMER WINDING

Filed Sept. 25, 1961

INVENTOR

Ernst Karger

BY George H. Spencer

ATTORNEY

United States Patent Office 3,230,414
Patented Jan. 18, 1966

3,230,414
DEFLECTION AMPLITUDE CONTROL USING AUXILIARY TRANSFORMER WINDING

Ernst Karger, Hannover, Germany, assignor to Telefunken Patentverwertungs-G.m.b.H., Ulm (Danube), Germany

Filed Sept. 25, 1961, Ser. No. 140,552
Claims priority, application Germany, Sept. 28, 1960, T 19,058
5 Claims. (Cl. 315—27)

The present invention relates generally to circuits, and, more particularly, to a device for adjusting the amplitude of the output of transformers, especially for adjusting the line deflection amplitude in television apparatus using magnetic deflection of the cathode ray electron beam by sawtooth currents.

This type of adjustment of the output amplitude is necessary in order to compensate for deviations of the image or picture size on the screen of the cathode ray tube due to deviations in the manufacturing operation and in the tubes themselves, as well as on fluctuations in the line voltage. It is known to provide the transformer with several taps and to put one end of the output circuit, or of the deflection coil circuit, selectively at one of these tapping points. In the multiple winding technique up to 20 and more transformer windings may be wound onto one coil body. These windings are later separated from one another by sawing or cutting the coil body. However, when this technique is used, it is very difficult to provide such tapping points. In transformers so produced, it has been the practice to connect a coil in series with the deflection coils, which coil was either selectively bridged by a switch, or plugged into appropriate sockets on the terminal plate of the transformer with rectification of a short circuit. However, such a known device requires relatively expensive equipment since the additional coil requires a separate ferrite core, a greater number of windings, and a special holding device.

With these defects of the prior art in mind, some objects of the present invention are to simplify and reduce the cost of deflection coil circuits.

These objects and others ancillary thereto are accomplished according to preferred embodiments, wherein a circuit is provided for adjusting the output amplitude of transformers by means of an additional winding connected in series with the transformer winding and with the load circuit for adjusting the line deflection amplitude in television apparatus with magnetic deflection of the electron beam of the cathode ray tube by sawtooth currents. The additional winding is formed by a winding having a small number of turns arranged on the transformer core and means for the selective connection of the ends of this winding with the end of the transformer winding and with the load circuit are provided in such a way that the winding may have its polarity reversed or may be switched off or out of the circuit.

Additional objects and advantages of the present invention will become apparent upon consideration of the following description when taken in conjunction with the accompanying drawings in which.

Figure 1:
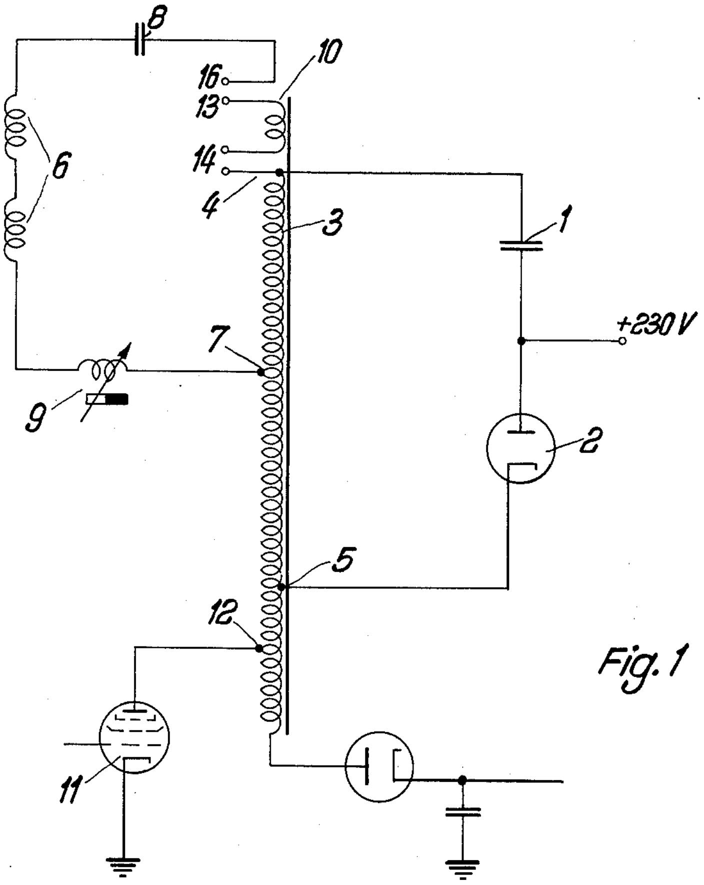
FIGURE 1 is a circuit diagram of a line deflection circuit incorporating the present invention therein.

With more particular reference to the drawings, FIGURE 1 shows a line deflection circuit wherein an approximately constant voltage is applied to a partial winding of the deflection transformer 3 between the points 4 and 5 by means of a capacitor 1 and a switching diode 2 which is conductive during the forward sweep of the sawtooth current. An approximately constant voltage is understood to mean a constant D.C. voltage onto which, for the correction of the so-called tangent error in cathode ray tubes with a flat fluorescent screen, a parabolic voltage component is superimposed, if necessary. This approximately constant voltage is transmitted by the transformer 3 to the deflection coils 6 which are connected between the points 4 and 7 of the transformer winding via a capacitor 8 which aids in the correction of the tangential error and via a distortion correcting device 9 operating with saturation, if necessary, as well as via an additional winding 10. A driving tube 11 compensates for the energy losses of the circuit during the forward sweep of the sawtooth current. This tube is connected to a tapping point 12 of the transformer 3. The tube 11 is to supply such a current that the switching diode 2 is conductive during the entire forward sweep or deflection. A voltage curve or characteristic, synchronized with the received synchronizing pulses, is generated, for example, in a blocking oscillator, a multivibrator, or a sine oscillator with subsequent distortion. This voltage is fed to the grid of the tube 11 with negatively directed voltage peaks, and causes the tube 11 to be blocked at the end of a forward sweep of the sawtooth current.

Figure 2:
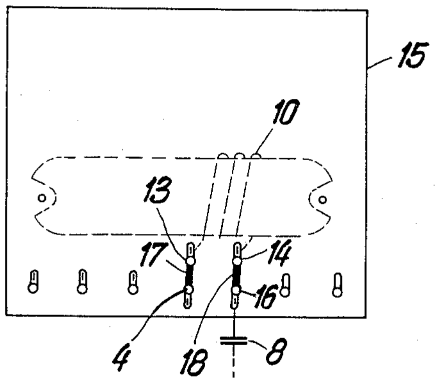
FIGURE 2 is a diagrammatic view of the terminal plate with a winding indicated in dash lines.

As shown in FIGURE 2, the winding 10 is wound onto one of the transformer legs and the ends of this winding are connected with terminals or sockets 13, 14 on a terminal plate 15 fixed to the transformer. In addition, the ends of the transformer winding and the connections 7, 16 of the deflection coil circuit are connected to further terminals of this terminal plate. The terminals 4, 13, 14 and 16 may be selectively connected with one another in such a way that in one case the deflection coil is directly connected to the transformer (connection 4, 16) while in two further cases the additional winding 10 with coils having an inverse direction (connection 4, 14 and 13, 16, or 4, 13 and 14, 16) is connected into the deflection circuit. In one case, this results in an increase and in the other case in a decrease of the deflection amplitude obtainable as compared to the case when winding 10 is not connected. This is based on the fact that in the winding 10 a voltage is induced which is either added or subtracted.

In the device according to FIGURE 2, the terminals 4, 13 and 14, 16, respectively, are connected with one another by switches, conductive straps, or conductors or lines 17, 18. In a preferred embodiment of the invention, a winding 10 with five turns is used. This winding may be in the form of a wire or a foil wound on the yoke, or on one end of the core legs, either interiorly or exteriorly of the other windings.

It is also possible to insert the winding 10 at a point in the deflection circuit at which a relatively light insulation for this winding is necessary. This may be done if capacitors are connected in series with the transformer winding between the points 5 and 7 and/or 4 and 7, and if a tapping point of the winding is grounded between the points 4 and 7, because then no D.C. potential is present between coil and core. This is made possible by the fact that the booster-capacitor is divided and arranged in such a way that the D.C. voltage is isolated from the deflection coil.

It will be understood that the above description of the present invention is susceptible to various modifications, changes, and adaptations, and the same are intended to be comprehended within the meaning and range of equivalents of the appended claims.

What is claimed is:

1. A circuit for television apparatus, comprising, in combination:

(A) cathode ray tube means having magnetic deflection using sawtooth currents; and (B) means connected to said tube means for adjusting the line deflection amplitude, said adjusting means including
  (a) a transformer having a core and a secondary winding disposed about said core, said winding having two terminals,
  (b) a load circuit having two terminals, one of said load circuit terminals being connected to one of said transformer winding terminals,
  (c) an additional winding disposed about said core and having less turns than said transformer winding, said additional winding having two terminals, and
  (d) means for selectively
    (1) connecting the additional winding terminals with the other terminals of said transformer winding and said load circuit, respectively, for selectively providing forward and reverse polarity, and
    (2) disconnecting said additional winding from the load circuit and the transformer winding.

2. A circuit as defined in claim 1, wherein said connecting means includes a terminal plate, the end of the transformer winding, the end of the load circuit, and the ends of said additional winding being connected to terminals on said plate.

3. A circuit as defined in claim 2, wherein said connecting means further includes contact bridge pieces for selectively connecting said ends together.

4. A circuit as defined in claim 2, wherein said connecting means further includes switches for selectively connecting said ends together.

5. A circuit as defined in claim 2, wherein said connecting means further includes conductors for selectively connecting said ends together.

References Cited by the Examiner

UNITED STATES PATENTS

| | | | |
|---|---|---|---|
| 1,818,589 | 8/1931 | Thornton et al. | 336—143 |
| 2,276,032 | 3/1942 | Gibbs | 336—143 |

DAVID G. REDINBAUGH, *Primary Examiner.*

LLOYD McCOLLUM, *Examiner.*